United States Patent [19]

Funatsu et al.

[11] Patent Number: 4,853,700
[45] Date of Patent: Aug. 1, 1989

[54] INDICATING SYSTEM FOR WARNING AIRSPACE OR THREATENING AIRCRAFT IN AIRCRAFT COLLISION AVOIDANCE SYSTEM

[75] Inventors: Chuhei Funatsu, Kanagawa; Kazuyuki Kita, Tokyo, both of Japan

[73] Assignee: Toyo Communication Equipment Co., Ltd., Samu Kawa, Japan

[21] Appl. No.: 882,977
[22] PCT Filed: Oct. 17, 1985
[86] PCT No.: PCT/JP85/00579
§ 371 Date: Jun. 30, 1986
§ 102(e) Date: Jun. 30, 1986
[87] PCT Pub. No.: WO86/02761
PCT Pub. Date: May 9, 1986

[30] Foreign Application Priority Data

Oct. 29, 1984 [JP] Japan ............... 59-227285

[51] Int. Cl.$^4$ ............................................. G01S 3/02
[52] U.S. Cl. .................................. 342/30; 364/461
[58] Field of Search ................ 364/461, 460; 342/29, 342/30

[56] References Cited

U.S. PATENT DOCUMENTS

| | | | |
|---|---|---|---|
| 3,310,806 | 3/1967 | Stanbury | 364/461 |
| 4,063,073 | 12/1977 | Stroyer | 364/461 |
| 4,320,287 | 3/1982 | Rawicz | 364/459 X |
| 4,380,050 | 4/1983 | Tamer | 364/461 |
| 4,578,757 | 3/1986 | Stark | 364/461 |
| 4,623,966 | 11/1986 | O'Sullivan | 364/461 |

FOREIGN PATENT DOCUMENTS

| | | | |
|---|---|---|---|
| 49-130698 | 12/1974 | Japan . | |
| 50-110752 | 1/1975 | Japan . | |
| 0079179 | 4/1986 | Japan | 342/29 |
| 0079180 | 4/1986 | Japan | 342/29 |

Primary Examiner—Thomas H. Tarcza
Assistant Examiner—Tod R. Swann
Attorney, Agent, or Firm—Wenderoth, Lind & Ponack

[57] ABSTRACT

The present invention relates to a indicating system for warning airspace or threatening aircraft in aircraft collision avoidance system which provides simply and inexpensively information required for safe cruising of aircraft with respect to range of warning airspace of aircraft, positions of other aircraft involving threatening of collision, and flight courses of proximate said other aircraft involving threatening of collision.

The present system can provide simply and inexpensively information indispensable for safe cruising of aircraft with respect to range of warning airspace of aircraft, positions of other aircraft involving threatening of collision, and flight courses of proximate said other aircraft involving threatening of collision by such manner that the warning airspace is changed into a required shape in response to speed of a subject aircraft, and indication range for the threatening aircraft is changed in response to angle of climb or descent of the subject aircraft, besides detected data of distances and bearings with respect to the other aircraft are indicated by a prescribed afterglow time.

6 Claims, 6 Drawing Sheets

INDICATING SYSTEM FOR WARNING AIRSPACE OR THREATENING AIRCRAFT IN AIRCRAFT COLLISION AVOIDANCE SYSTEM

TECHNICAL FIELD

This invention relates to an indicating system for warning airspace or threatening aircraft in aircraft collision avoidance system, and particularly to an indicating system for warning airspace or threatening aircraft in aircraft collision avoidance system by which safety for airline service is maintained by indicating a range for the airspace to be warned by aircraft, positions of other aircraft with threatening of collision, and flight paths of the approaching other aircraft with said threatening of collision.

BACKGROUND ART

Conventional aircraft collision avoidance systems which have heretofore been used or studied in general relate essentially to such a type of system wherein ATC transponder response signal of another aircraft responding to such interrogation signal delivered from the collision avoidance system of a subject aircraft is received to catch approximate position of the other aircraft from a period of time required for such interrogation and response, electric field intensity received, bearing the the like, and these results are indicated on an indicator. In this system, it is general that such circle corresponding to a required radius, e.g., 2 n.m. (nautical mile) centering around the subject aircraft is described on the indicator in order to concentrate pilot's attention to the other aircraft with actually threatening of collision viewed from the subject aircraft, and only the other aircraft positioned within the circle are judged as threatening aircraft to indicate them on the indicator.

In this type of conventional indicating system, however, the circle displaying said warning airspace is fixed to, for example, a radius of about 2 n.m., so that there is such disadvantage that sufficient effect cannot be attained dependent upon speeds of the subject and other aircraft.

Specifically, if it is assumed that the subject and another aircraft are approaching with a head to head relationship at each velocity of 500 kt (knots), a period of time from the point when said other aircraft appears in said circle to the point when both the aircraft collide with each other is $t=2/(500+500)$ hours$=7.2$ seconds. This is absolutely insufficient for avoiding operation of the collision. For the sake of such collision avoidance, when a radius of the circle displaying said warning airspace is increased, number of the aircraft displayed in the circle increases. This bothers extremely pilot so that it is self-evident to be difficult for the pilot that his attention is concentrated to the true threatening aircraft, and hence such system has been difficult for practical application.

On one hand, in the case where the ATC transponder mounted on said other aircraft is one being capable of responding to interrogation signal in mode C or S, the response signal contains altitude information of the very other aircraft, so that it is possible to detect an altitude different between the subject and other aircraft. In this case, it is usual to indicate each altitude difference of other aircraft flying around the subject aircraft with respect thereto.

However, in conventional indicating systems for threatening aircraft as mentioned above, manner of the indication is complicated, besides most of them display merely an altitude difference between the subject and other aircraft irrespective of attitudes of them, e.g., ascending or descending attitude and the like, so that these systems involve such disadvantage by which not so effective results are obtained for collision avoidance.

Furthermore, there have heretofore been proposed a variety of systems in which existence or positions of approaching aircraft, and in its turn change in relative positions of a subject and other aircraft with time are indicated for pilots of aircraft in order to prevent aircraft collision accident from occurring.

Among these systems, there is a manner for indicating change in relative positions between the subject and other aircraft with time, i.e., tracking display for the pilots.

In order to precisely track the courses of other aircraft, however, it is necessary that relative distances and bearings of the subject to other aircraft, besides altitudes of them are detected from response signals of the ATC transponders mounted on the other aircraft flying around the surroundings of the subject aircraft, the information detected is stored in a memory, change of these amounts detected with time is calculated, and such results are momentarily indicated in indicator. Thus, such system requires memory having large capacity, and it cannot be avoided that software to be used for operation becomes complicated and enormous, so that there is such disadvantage that aircraft collision avoidance systems to be mounted on the respective aircraft become large-sized and expensive.

Accordingly, the present invention has been made to eliminate disadvantages involved in conventional indicating systems for warning airspace or threatening aircraft in aircraft collision avoidance system as described above. It is an object of the present invention to provide an indicating system for warning airspace or threatening aircraft in aircraft collision avoidance system wherein a shape of the warning airspace is transformed into a required one in response to the speed of a subject aircraft, whereby a time necessary for avoiding operation of collision of the subject and other aircraft is maintained and at the same time, diversion of pilot's attention with respect to its true threatening aircraft is prevented to attain safety in airline service, besides indication of threatening aircraft is decided and made in relation to attitude of the subject aircraft, whereby the system itself is made simple and inexpensive, and further pilot's judgement required for operation of collision avoidance is made easy. Another object of the present invention is to provide an indicating system for warning airspace or threatening aircraft in aircraft collision avoidance system wherein detected data of other aircraft's distances and bearings are displayed with a required afterglow time, whereby courses of the other aircraft may simply and inexpensively be indicated.

SUMMARY OF THE INVENTION

The present invention relates to an indicating system for warning airspace or threatening aircraft in aircraft collision avoidance system wherein a range of the airspace for a subject aircraft to be warned in respect of aircraft collision is changed in response to the speed of the subject aircraft, whereby a time necessary for avoiding operation of collision of the subject and other aircraft is maintained and at the same time, diversion of pilot's attention with respect to its true threatening aircraft is prevented to attain safety in airline service.

Furthermore, the present invention relates to an indicating system for warning airspace or threatening aircraft in aircraft collision avoidance system wherein a range for indicating threatening aircraft is changed in response to angle of climb or descent of the subject aircraft, whereby the system itself is made simple and inexpensive, and further pilot's judgement required for operation of collision avoidance is made easy.

Moreover, the present invention relates to an indicating system for warning airspace or threatening aircraft in aircraft collision avoidance system wherein distances and bearings of other aircraft with respect to a subject aircraft are detected by receiving response signal derived from an ATC transponder mounted on said other aircraft, and at the same time the detected data are displayed with a required afterglow time in the indicating system for threatening aircraft, whereby the courses of said other aircraft may simply and inexpensively be indicated.

DETAILED DESCRIPTION

The present invention will be described in more detail hereinbelow by referring to the accompanying drawings.

In order to assist understanding of this invention, a premise from the foundation of the invention will simply be described.

Generally, in the case where a subject aircraft is on a cruise at high speed, for example, when the subject aircraft is flying over the Pacific Ocean, other aircraft flying around the surroundings of the subject aircraft are also on cruise at substantially the same speed, whilst when the subject aircraft flies at low speed as in the case where the aircraft is waiting for its landing turn in the vicinity of airport, it may be assumed, as a general rule, that neighbouring other aircraft fly also at the substantially same speed.

Accordingly, it may be considered that danger of collision is in front of the subject aircraft, so that not so much attention is required in the rear thereof, in other words, there is not so much danger of rear-end collision.

Furthermore, it is found that the minimum time required for operation of collision avoidance is about 25 seconds in large-sized airplane.

In these circumstances, when it is assumed that a period of time from appearance of another aircraft flying at a speed V within the circle of warning airspace having a radius of 2 n.m. which is commonly used in conventional indicating systems in aircraft collision avoidance system to occurence of a head-on collision of said other aircraft against the subject aircraft flying at substantially the same speed is 25 seconds, it may be expressed by an equation $2/2V \times 3600 = 25$. From the equation, $V = 144$ kt, and when a speed of air liner in these days is taken into consideration, such value 144 kt is appropriate value used for the minimum warning airspace.

Figure 1A:
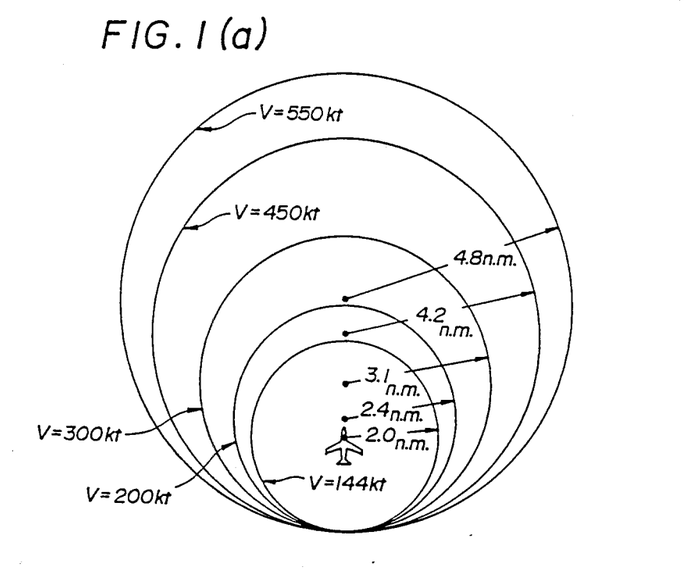
FIGS. 1(a), 1(b) and 1(c) are explanatory views each showing a display profile of a different indicating system according to the present invention.

Thus, the minimum warning airspace on an indicator is placed within a circle centering around the subject aircraft with a radius of 2 n.m., and at the same time each point corresponding to 2 n.m. in the rear of the subject aircraft is always determined, whilst each point corresponding to a distance L n.m., which is $L = 50V/3600$ from $L/2V \times 3600 = 25$, is determined in the front of the subject aircraft with increase in speed of the subject aircraft as shown in FIG. 1(a), so that such circle described with a diameter of the distance defined between both said points is utilized for a warning airspace. A variable display of such warning airspace may either be changed in stepless manner in response to speed V of the subject aircraft, or changed in stepped manner with respect to a suitable range for change in speed.

Meanwhile, it may be considered that the indication changing system for warning airspace as shown in FIG. 1(a) brings in excessive warning airspace along the directions at 4 and 8 o'clock in the flank of the subject aircraft.

Figure 1B:
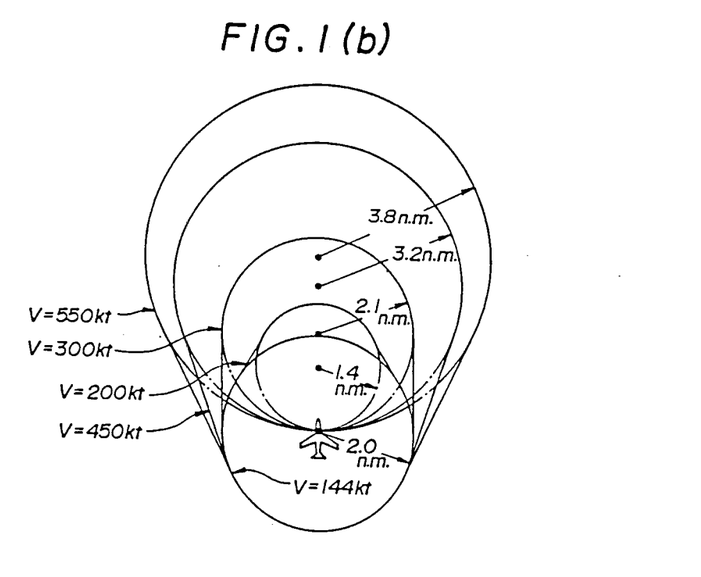

In this connection, as shown in FIG. 1(b), both of a circle centering around the subject aircraft with a radius of 2 n.m. and another circle passing through position of the subject aircraft with a diameter corresponding to L n.m., as described above, $L = 50V/3600$, in flying direction of the subject aircraft are described, and such a profile defined by connecting the outer circumferences of both the circles with each other is obtained as a warning airspace. The resulting profile may be indicated in an indicator as the warning airspace, and such manner for establishing warning airspace as just described above is more reasonable.

However, when the system as shown in FIG. 1(b) is employed, the profile of warning airspace deviates from the safety side in the vicinity of 200 kt being flight speed of general air liner in an airport and its borders, in other words, the warning airspace becomes narrow with respect to other aircraft approaching from the directions at 2 and 10 o'clock of the subject aircraft, and this is very dangerous.

Figure 1C:
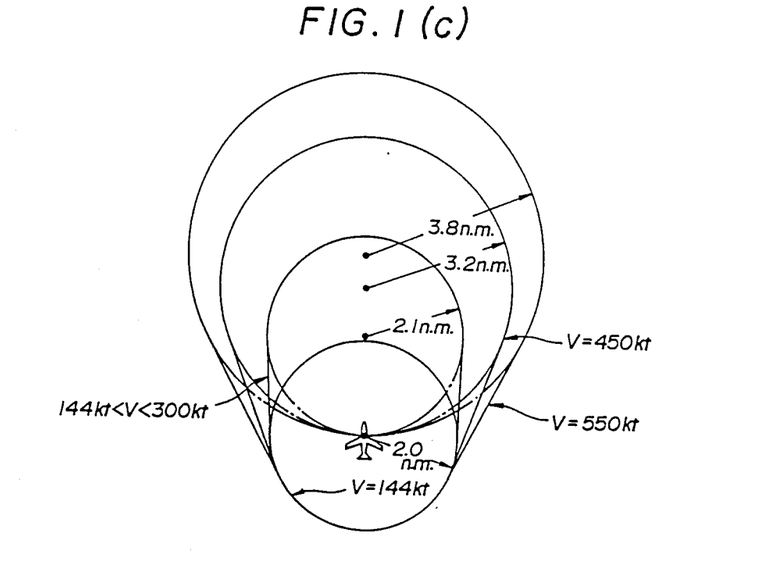

In this respect, it is safer that such a profile of oval shape obtained by connecting the outer circumferences of overlapped circles each having a radius of substantially 2 n.m. is utilized as the warning airspace with respect to a speed V of the subject aircraft ranging from 144 kt to 300 kt as shown in FIG. 1(c).

Figure 2:
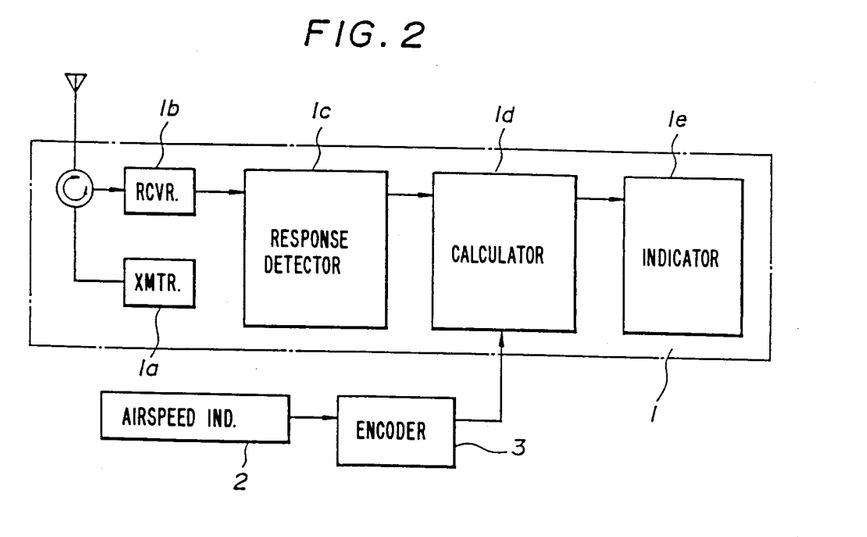
FIG. 2 is a block diagram showing an example of circuit for indicating the above-mentioned profiles in an indicator.

In order to realize such warning airspace indicating system as mentioned above, a conventional aircraft collision avoidance system 1 comprising, as shown in FIG. 2, a transmitter 1a, a receiver 1b, a response detector 1c, a calculator 1d, and an indicator 1e is used, besides such information of subject aircraft's speed obtained by encoding, if necessary, indication of an airspeed indicator 2 by means of an encoder 3 is inputted to said calculator 1d, such necessary calculation as mentioned above is made on the basis of said information, and as a result a profile responding to speed of the subject aircraft may be drawn in the indicator 1e.

While the above description has been made in connection with the case where an indication range is changed in response to speed of the subject aircraft, this conception may be amplified, and more specifically, such indication may be changed in response to attitude, i.e., angle of climb or descent of the subject aircraft as fully described hereinbelow.

Figure 3:
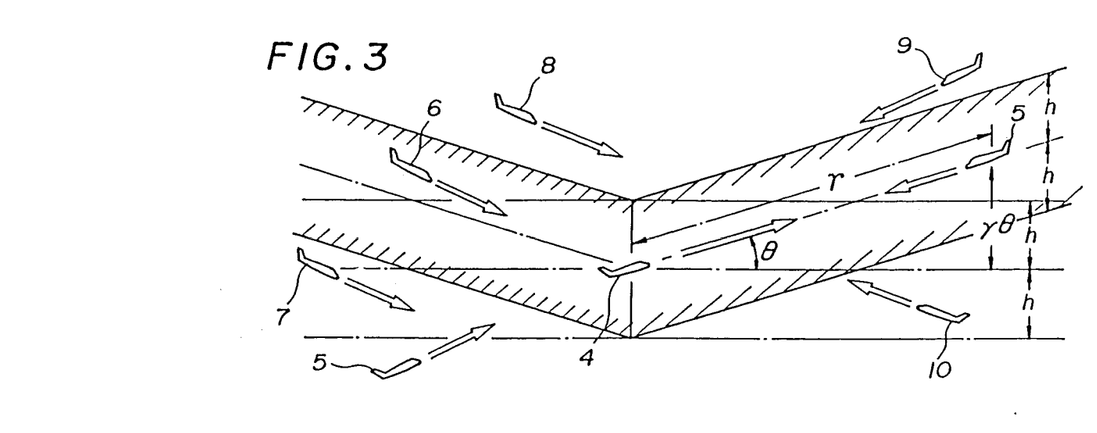
FIG. 3 is an explanatory view illustrating a concept of the indicating system for threatening aircraft according to the present invention.

FIG. 3 is a view for explaining essential conception of the second system according to the present invention. On the other hand, a conventional aircraft collision avoidance system has indicated in such that each altitude difference is +x feet or −y feet with respect to other aircraft existing within a range where altitude difference h is generally ±1,000 feet irrespective of flight attitude of the subject aircraft 1, so that the indication has been complicated and of little practical use.

In the present invention, an angle of climb or descent $\theta$ of a subject aircraft 4, a realtive distance $\gamma$ and an altitude difference $\Delta H$ between the subject and other aircraft are detected, so that either only other aircraft $\Delta H$ of which is within a range of $\gamma\theta \pm h$, for example 5 and 6 are indicated by different manner from that for indicating the other surrounding aircraft.

Thus, such surrounding other aircraft existing in a corridor hatched in FIG. 3 with a width of the upper side h and lower side h along the flying direction of the subject aircraft where there is actually the highest danger are watched by the subject aircraft's pilots, and hence it is found that this system is practical and effective in view of avoidance of collision.

Figure 4:
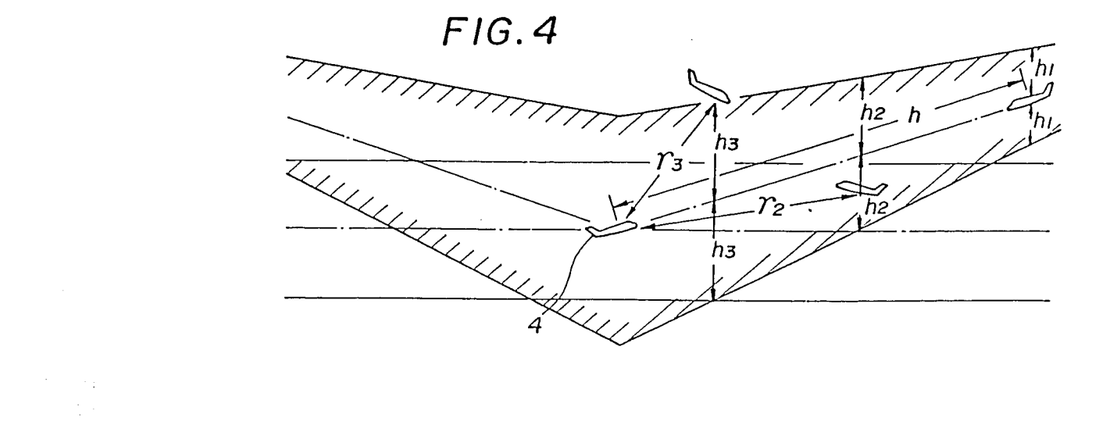
FIG. 4 is an explanatory view illustrating a concept of the indicating system for threatening aircraft obtained by partially improving the indicating system of FIG. 3.

In this case, since the other aircraft 6 or another aircraft 7 approaching from the rear of the subject aircraft 4 among other aircraft which are not displayed as threatening aircraft has a low relative speed, there is little problem, but it might be considered that indication of threatening aircraft delays with respect to other aircraft 8, 9 or 10, which is coming into the course of the subject aircraft 4, so that there is a dangerous case. In this respect, such problem may be solved by either a manner in which, for example, said width h is made properly larger than 1,000 feet which has heretofore been utilized in general, or a manner wherein a value of width h is varied dependent upon a realtive distance $\gamma$ of the subject to other aircraft as shown in FIG. 4, in other words, when a value $\gamma$ is low, h is made wide thereby to intend safer airline service.

In the case where the indicating system as mentioned above is utilized, even if an altitude difference $\Delta H$ between the subject and other aircraft is, for instance, within a range of $\gamma\theta \pm h$, it is not necessary for indicating such other aircraft existing at so far points as threatening aircraft. In this case, it is arranged in such that such other aircraft a relative distance $\gamma$ of the subject to the other aircraft of which is a predetermined value, e.g., 2 n.m. or more are not indicated as threatening aircraft, whereby pilots should be free from useless watch.

Figures 5, 6:
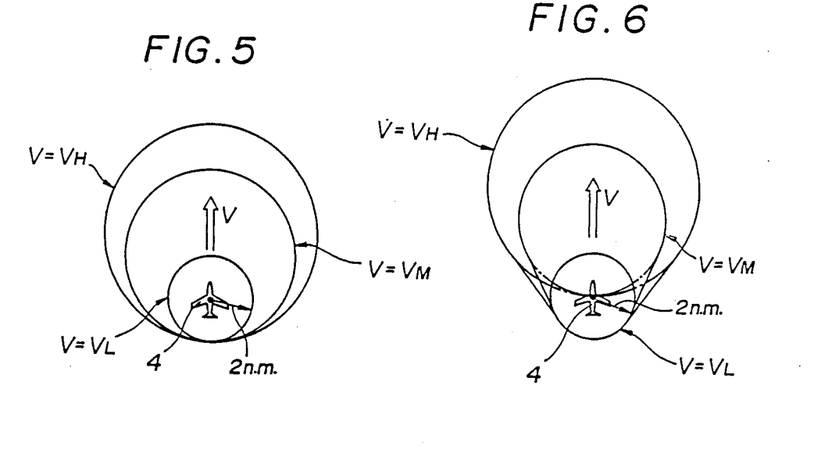
FIGS. 5 and 6 are explanatory views each illustrating a pattern of different indicating range in the case where such range within which other aircraft are indicated as threatening aircraft is made variable in response to speed of a subject aircraft.

Furthermore it is more practical that indication limit as threatening aircraft is made variable dependent upon a speed of the subject aircraft. In this case, indication range for threatening aircraft may be in such that a spacing of 2 n.m. is always kept at the rear of the subject aircraft 4, and such circle the diameter of which increases forward at a prescribed rate with increase in speed V is described as shown in FIG. 5. One one hand, as said indication range, such a profile defined by connecting both outer circumferences of a circle surrounding the subject aircraft 4 with a radius of 2 n.m. and another circle passing through position of the subject aircraft and the diameter of which varies at a predetermined rate dependent upon speed of the subject aircraft may be used as shown in FIG. 6.

Moreover such other aircraft indicated in said profile and altitude difference $\Delta H$ is within a range $\gamma\theta \pm h$ are indicated by either different color tone from that for indicating the other aircraft, or flicker display so that it is convenient for drawing pilots' attention with respect to true threatening aircraft.

Figure 7:
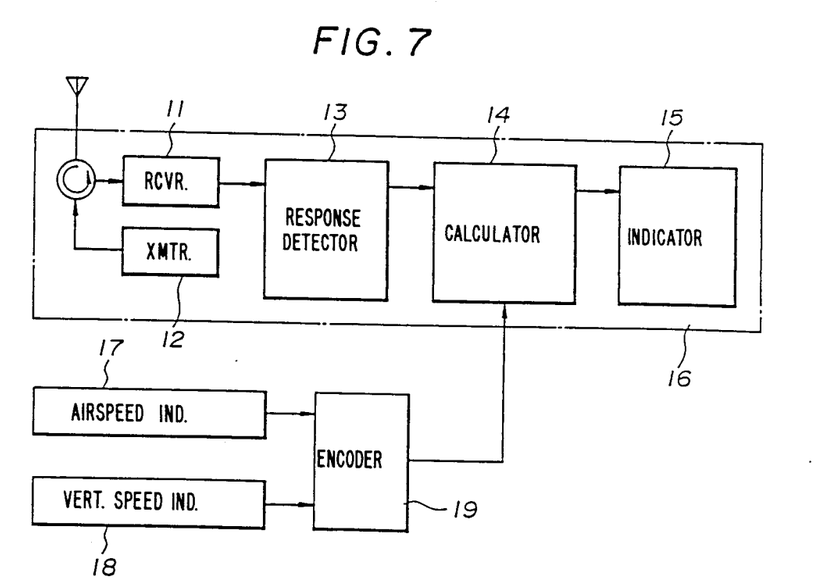
FIG. 7 is a block diagram showing an embodiment for realizing the indicating system for threatening aircraft according to the present invention.

For the sake of realizing the indicating system as mentioned above, a circuit, for example, as shown in FIG. 7 may be utilized. In the circuit, signals from an airspeed indicator 17 and a vertical speed indicator 18 are encoded by an encoder 19, the encoded signals are inputted to a calculator 14 of the most common aircraft collision avoidance system 16 comprising a receiver 11, a transmitter 12, response detector 13, said calculator 14, and an indicator 15, said angle of climb or descent $\theta$ is calculated in accordance with a prescribed program, based on the calculated value, operation of said $\gamma\theta \pm h$ is conducted, comparison of an altitude difference $\Delta H$ between the subject and other aircraft is effected, and the result may be indicated in said indicator 15. In this case, said relative distance $\gamma$ and altitude difference $\Delta H$ between the subject and other aircraft are obtained by analyzing such ATC transponder response signal in mode C or S received by said receiver 11.

Said angle of climb or descent $\theta$ in the subject aircraft can precisely be calculated from output of INS (inertial navigation system), if the aircraft is equipped with the INS.

In indication of the aircraft collision avoidance systems as described above, it is general in any case that the sight of the other aircraft positioned within an indicating range is displayed with spot. In this case, however, when tracking display is effected in accordance with a simple manner as described hereinbelow, pilots can more easily recognize such display so that their load can be reduced.

Figure 8A:
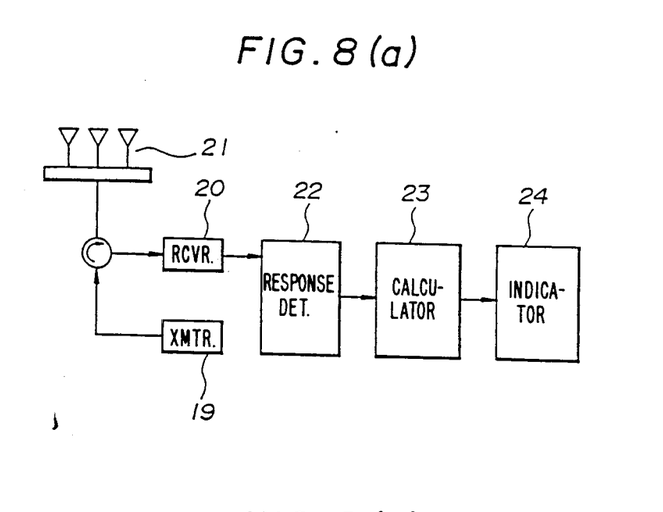
FIG. 8(a) is a block diagram showing an example of the collision avoidance system for aircraft according to the present invention.

FIG. 8(a) is a block diagram illustrating an example of the present invention wherein the system is constructed in such that an interrogation signal transmitter 19 and a receiver 20 for response signal from transponders mounted on other aircraft are connected to an array antenna 21, and at the same time output of said receiver 20 is inputted to a calculator 23 through a response detector 22, and the calculated result obtained is indicated in an indicator 24 having long afterglow time. The system described above is mounted on at least a subject aircraft.

In the present system, when said transmitter 19 delivers interrogation signal, said array antenna 21 functions as a non-directional antenna, and on one hand, when response signal is received, arrival bearing of response signal is detected from phase difference of signals received by each array.

A relative distance of the subject aircraft to a source for transmitting said response signals can be decided from a time required for interrogation and response.

Figure 8B:
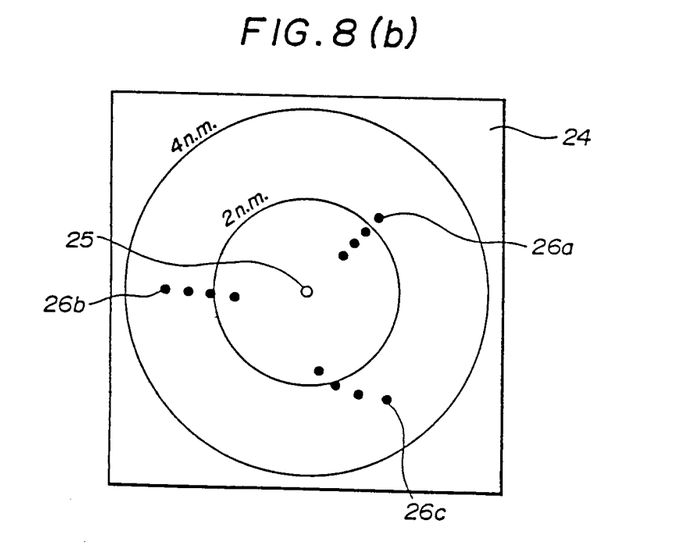
FIG. 8(b) is a view showing an indicating manner for the example of FIG. 8(a)

The response signal thus detected from the ATC transponder mounted on other aircraft flying around the surroundings of the subject aircraft is stored in a memory built in said calculator 23, required operation is conducted, and then the result is indicated in said indicator 24 as spots. In this case, when it is arranged in such that an interrogation period of the interrogation signal delivered from the subject aircraft is made, for example, to be every one second and an afterglow time of the display CRT is made to be 4 or 5 seconds, positions of other aircraft are displayed as four or five of spots being in close proximity to one another, besides the spots which were displayed before four or five seconds disappear gradually. Accordingly, pilots can recognize that surrounding other aircraft 26a, 26b, and 26c exist at which positions and they are flying towards which direction.

Meanwhile, when the tracking system as mentioned above is utilized, there is a possibility that pilots are rather confused. Because, in an airspace where congestion of air traffic is observed, particularly as in airport and its borders, various response signals with respect to not only interrogation signals from the subject aircraft, but also those delivered from other aircraft as well as interrogation station of ground surveillance radar are received at the same time, besides their interrogation periods are also random, so that responses with respect to these various interrogation signals are displayed in said indicator, and the indication of them does not disappear for a long period of time.

Figure 9:
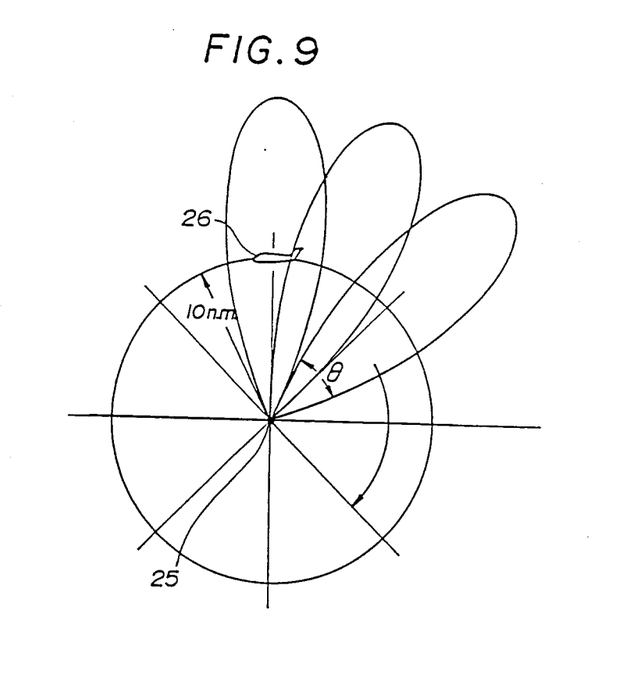
FIG. 9 is an explanatory view for describing another tracking system according to the present invention.

In order to solve the problems as mentioned above, directivity is given to the interrogation signal delivered from the subject aircraft in case of transmitting the signal as shown in FIG. 9, reception bearing is fixed to transmission bearing of said interrogation signal during a period in which said response signal returns, and such operations are successively repeated to perform the same with respect to the whole circumference of subject aircraft 25.

In this case, when surveillance is intended to effect with respect to only such other aircraft existing within a range of, for example, 10 n.m., a fixing time for transmission and reception beam of the antenna is $2 \times 10 \times 1.85/300,000 + 21 \approx 142$ μS in case of interrogation response in mode C (21 μS).

Furthermore, if it is assumed that the beam angle $\theta$ and shift of beam are 22.5° and 10° per time, respectively, a time required for surveillance around the whole circumference of the subject aircraft 25 is $142 \times (360/10) \approx 5$ ms, so that omnidirectional surveillance becomes possible for a sufficiently short period of time.

However, it is inconvenient to continuously conduct 36 times of interrogation per 5 ms as mentioned above, because frequency of disturbance increases with respect to ground secondary surveillance radar or aircraft collision avoidance systems mounted on other aircraft. In this respect, after completing 5 ms/36 times of interrogation, transmission of interrogation signal as well as reception of response signal may be ceased for a certain period of time, e.g., 1 or 2 seconds. Even if such ceasing time for reception of interrogation and response as mentioned above is established, spots in close proximity to one another have been still displayed in an indicator of the aircraft collision avoidance system according to the present invention, so that pilots can operate the subject aircraft while watching the remaining spots.

On one hand, a range for warning and surveillance in aircraft should be changed dependent upon its flight environment. More specifically, it is also necessary for getting hold of flight situation of such other aircraft existing at distant places, for example, in case of high speed cruising over the Pacific Ocean, whilst it is required to correctly catch only the positions of such other aircraft existing in the vicinity of a subject aircraft in airport and its borders.

Figure 10:
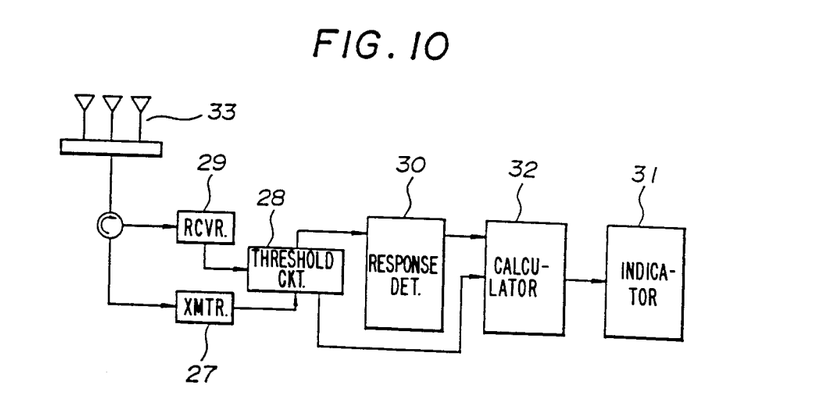
FIG. 10 is a block diagram showing another example of the collision avoidance system for aircraft according to the present invention.

To cope with the above request, a threshold circuit 28 for preventing reception of response signal is interposed between said receiver 29 and said response detector 30 after the lapse of a prescribed time after completing transmission of interrogation signal from said transmitter 27 for interrogation signal as shown in FIG. 10, and reception of such response signal delivered from, for example, a place where is distant 2 n.m. or more from the subject aircraft is prohibited, and at the same time indication scale of said indicator 31 may be made variable in relation to establishment of the threshold value (Reference numeral 33 designates an array antenna, 32 a calculator, respectively). Thus, pilots can avoid complexity of their judgement due to the fact that many other aircraft of which operation of the subject aircraft is scarcely threatened are displayed in the indicator, and in its turn, their erroneous judgement based thereon.

It is to be noted that said establishment for threshold is not necessarily conducted dependent upon time, but such a range wherein response signal is received dependent upon reception level may be established in the case where the interrogation signal delivered from the subject aircraft is non-directional or the like case.

According to the tracking system of the present invention, it is impossible to trace altitude of other aircraft. In this respect, if such trace is positively intended to realize, enormous memories and softwares for operation processing are required, after all, likewise in conventional tracking system which has heretofore been proposed.

In order to avoid such problem as described above, such a manner that altitude difference between the subject and other aircraft is judged with respect to response signal in mode C or S containing altitude information, whereby other aircraft existing at higher position and the other aircraft existing at lower altitude than that of the subject aircraft are displayed by means of different colors or appending sign + or − to the spots on the indicator may be utilized.

In accordance with the manner described above, it becomes possible to simply judge that, for example, there is no danger for collision as to such another aircraft which is displayed as if it shifts from a low altitude to a high altitude during subject aircraft's descent, even though the other aircraft is displayed as if it approaches remarkably to said subject aircraft. Furthermore, if it is arranged in such that a horizontal region can freely be switched over a region with a prescribed angle in case of climb or descent to scan warning airspace for confirming threatening aircraft, positive safety with respect to such threatening aircraft can be maintained. Decision of said prescribed angle can be effected by the construction shown in FIG. 7, whilst the switching operation may either manually be performed, or by means of the calculator 14 in FIG. 7. Besides, at that time, designating symbol is displayed by means of control of the calculator 14 so as to confirm which direction is watched.

INDUSTRIALLY APPLICABLE FIELD

As described above, the indicating system for warning airspace or threatening aircraft in aircraft collision avoidance system according to the present invention can provide simply and inexpensively information required for safe cruising with respect to warning range of aircraft, positions of other aircraft involving threatening of collision, and flight courses of proximate said other aircraft involving threatening of collision in, as a matter of course, large- and medium-sized airplanes such as air liner, commuter and the like, besides small-sized airplanes such as private airplanes and the like. Accordingly, the system of the present invention is useful for reducing the cost of the airplane itself and is also suitable for safe airline service.

We claim:

1. A warning airspace indicating system belonging to an aircraft collision avoidance system of a subject aircraft having a function of determining the existence of danger of aircraft collision by receiving response signals from other aircraft in response to interrogation signals delivered from said subject aircraft, said indicating system for warning airspace or threatening aircraft in said aircraft collision avoidance system including a means for defining a warning airspace arranged around said subject aircraft, wherein the range of the warning airspace expands and contracts along the flight direction of said subject aircraft in dependence upon the speed of said subject aircraft, said warning airspace defined to have a shape including a cylindrical shape of fixed diameter centered on said subject aircraft and another cylindrical shape of variable diameter which varies in accordance with the speed of the subject aircraft and whose center is disposed along the flight direction of said subject aircraft at a distance from said subject aircraft which varies in dependence upon the speed of said subject aircraft.

2. A warning airspace indicating system belonging to an aircraft collision avoidance system as recited in claim 1, further comprising a means for detecting an angle of climb or descent $\theta$ of said subject aircraft, a relative distance $\theta$ and an altitude difference $\Delta H$ between said subject aircraft and other aircraft, such that either only said other aircraft the $\Delta H$ of which is within a range of $\gamma\theta \pm h$, within h is a prescribed altitude, are judged so as to indicate them as threatening aircraft, or these threatening aircraft are indicated in a different manner from that used for indicating other surrounding aircraft.

3. A warning airspace indicating system belonging to an aircraft collision avoidance system as recited in claim 2, wherein a prescribed altitude H is variable dependent upon a relative distance $\gamma$ of said subject aircraft to other aircraft.

4. A warning airspace indicating system belonging to an aircraft collision avoidance system as recited in claim 2, wherein when a relative distance $\gamma$ of said subject aircraft to other aircraft is larger than a prescribed value, said other aircraft within said range of $\gamma\theta \pm h$ are indicated as threatening aircraft.

5. A warning airspace indicating system belonging to an aircraft collision avoidance system as recited in claim 2, wherein said range for indicating threatening aircraft with respect to said other aircraft within said range of $\gamma\theta \pm h$ varies in dependence upon the speed of said subject aircraft.

6. A warning airspace indicating system belonging to an aircraft collision avoidance system as recited in claim 2, wherein, unlike the other aircraft, said threatening aircraft are indicated by means of either a different color tone from that for indicating said other aircraft, or by means of flickering display.

* * * * *